Oct. 14, 1941.　　　　G. L. EATON　　　　2,258,749
TREATMENT OF HYDROCARBON FLUIDS
Filed June 4, 1938
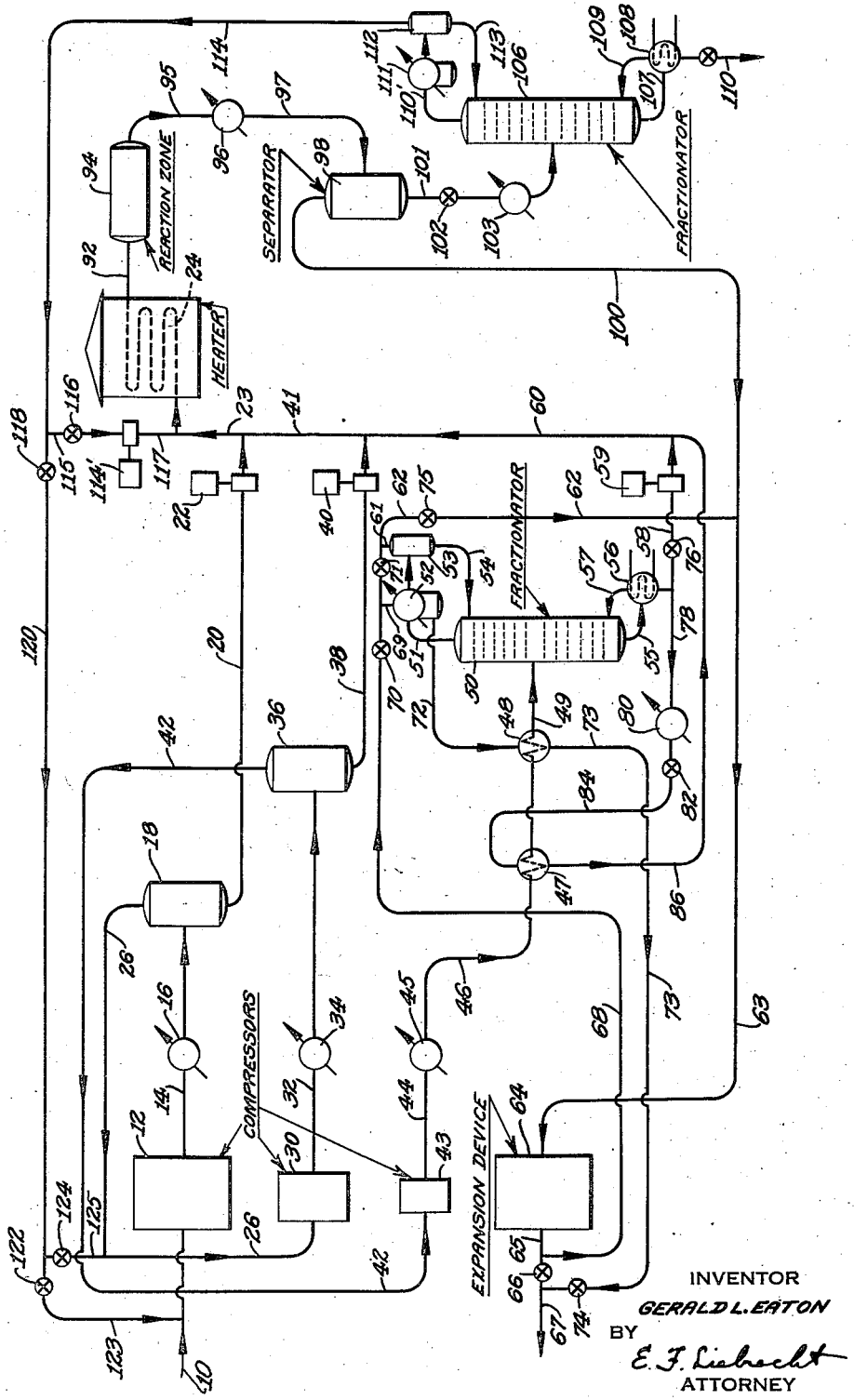
INVENTOR
*GERALD L. EATON*
BY
*E. F. Liebrecht*
ATTORNEY Patented Oct. 14, 1941

2,258,749

UNITED STATES PATENT OFFICE 2,258,749

TREATMENT OF HYDROCARBON FLUIDS

Gerald L. Eaton, Glen Osborne, Pa., assignor to The Polymerization Process Corporation, Jersey City, N. J., a corporation of Delaware Application June 4, 1938, Serial No. 211,835

3 Claims. (Cl. 196—10)

This invention relates to the treatment and conversion of hydrocarbon gases to higher boiling hydrocarbons.

According to this invention, gases resulting from cracking processes for converting higher boiling hydrocarbons into lower boiling hydrocarbons, or hydrocarbon gases from other sources, are passed through a series of compression stages to separate light gases such as hydrogen and methane from a mixture of hydrocarbon gases which have higher boiling points than methane. Methane is inert to thermal treatment below about 1800° F., and it is therefor desirable to remove it from the gases to be converted.

In effecting the desired removal of light gases, the total gases are passed through a first compressor and are then passed through a cooler and to a separator to separate uncondensed gases from liquid. The liquid together with liquid separated from other receivers or separators is passed through a conversion zone wherein it is maintained under suitable temperature and pressure conditions to effect the desired extent of conversion.

The gases from the first separator are passed through a second compressor and the compressed gases are passed through a second cooler and then to a second separator wherein uncondensed gases are further separated from liquid. The gases from the second separator are passed through a third compressor and the compressed gases are cooled and passed to a third separator for the separation of uncondensed gases from liquid. The gases from the third separator, if three separators are used, or from the last of any number of separators, form the undesirable portion of the original charge of gases, but as they are under a high pressure it is advantageous to pass them through an expansion engine or other mechanical device to recover the energy in the gases obtainable by releasing the pressure. The expansion engine may be used to run the compressors or may be used to operate other mechanisms and the compressors may be run by other means.

The liquid fractions separated in the separators which contain normally gaseous hydrocarbons such as ethane, propane, butane, and their corresponding olefins, when refinery gases are processed, are passed through a heating and conversion zone wherein they are maintained under such conditions of temperature and pressure to effect the desired conversion into higher boiling hydrocarbons. The heated products from the reaction or conversion zone are then cooled and passed to a high pressure separating zone for separating gases from liquid. These separated gases contain the bulk of the relatively inert gases and may be passed directly to the expansion engine. The liquid, including liquefied ethane, propane, butane and their corresponding olefins, is passed to a fractionating tower to separate these hydrocarbons from higher boiling hydrocarbons containing gasoline constituents, the gases thus separated being either recycled directly through the conversion zone or first returned to the compression system and separated as above described prior to thermal treatment.

Instead of passing the gases from the last or third separator, if three are used, to the expansion engine, it is within the contemplation of my invention to pass a portion or all of such gases through a pressure reducing valve to cool said gases by expansion and thereafter use such cooled gases to cool the charge being passed to the third or last separator to cause further condensation of the liquid products in the charge. Likewise the gases cooled by expansion through the expansion engine, if this device is used, may be used for the cooling purpose just described. As a third or last separator a fractionating tower is preferably used to obtain a better separation of inert gases from the desirable constituents in the charge to the third or last separator.

The gases cooled by expansion through the expansion engine or through the pressure reducing valve above described may be utilized to furnish part of the cooling required to provide reflux for fractionation. Additional cooling may be provided by refrigeration or other conventional means. Also, a part or all of the liquid withdrawn from the last separator may be passed through a pressure reducing valve to effect vaporization and cooling thereof in cases where the heating and conversion zone is under lower pressure than the last stage of separation and the thus cooled hydrocarbons passed in indirect contact with the charge being passed to the last separator to further cool the charge and cause further condensation of liquefiable constituents therefrom.

The drawing represents a diagrammatic illustration of apparatus suitable for practicing my invention.

Referring now to the drawing, the reference character 10 designates a line for conveying gases resulting from the cracking of higher boiling hydrocarbons into lower boiling hydrocarbons of the nature of gasoline. Similar gases from other sources may be used or, if desired, natural gas may also be used. As is known, such gases may be thermally treated to produce higher boiling hydrocarbons. However, such gases contain some light constituents, such as hydrogen and methane, which are not affected by the thermal treatment below about 1800° F. and therefore are merely diluents in the gases. It is desirable to remove light constituents from the gases to be converted in order to obtain better yields at lower cost. I subject the gases to a series of compression stages to separate light, relatively inert gases from liquid containing hydrocarbons having a higher boiling point than methane, such as $C_2$, $C_3$ and $C_4$ hydrocarbons, the liquids being further thermally treated to obtain higher boiling hydrocarbons. If desired, ethane can also be removed with the methane and hydrogen. The separated light gases being under pressure are used to run an expansion engine or similar device to recover energy therefrom.

The gases resulting from the conversion of higher boiling hydrocarbons into lower boiling hydrocarbons, or other gas to be treated, are passed through line 10 to a first compressor 12 wherein the gases are preliminarily compressed. The gases under pressure leave the first compressor through line 14 and are passed through a cooler 16 and then to a separator 18 wherein liquid is separated from uncondensed gas. The liquid is withdrawn and passed through line 20 by pump 22 and then through line 23 to a heating coil or zone 24 as will be hereinafter described in more detail. The gases separated in separator 18 are passed through line 26 to a second compressor 30 wherein the gases are further compressed. The compressed gases leave the second compressor through line 32 and are passed through a second cooler 34 to a second separator 36 wherein uncondensed gases are separated from liquid. The liquid is withdrawn from the bottom of the second separator and passed through line 38 by pump 40 and pumped through lines 41 and 23 to the heating zone or coil 24. The gases from the second separator 36 are passed through line 42 to a third compressor 43 wherein the gases are further compressed.

The compressed gases from the third compressor are passed through line 44 and cooler 45, and then through line 46, cooler 47, cooler 48, and line 49 to a separator or fractionating tower 50 wherein uncondensed gases are separated from liquid. While I may use a separator 50 similar to the separators 18 and 36 I prefer to use a fractionating tower as I am able to secure a sharper separation of gases from liquid. Gases leave the fractionating tower 50 through line 51 and pass to a condenser 52 in which cooling is provided to condense a liquid reflux which is separated from uncondensed gases in separator 53 and returned to the fractionating tower 50 through line 54. In order to efficiently separate inert gases such as hydrogen and methane which are dissolved in the liquid introduced into fractionating tower 50 through line 49, the liquid descending in the fractionating tower is withdrawn through line 55 and passed through reboiler 56 wherein heat is supplied from an outside source.

The gases separated in reboiler 56 are returned to the fractionating tower 50 through line 57 and pass upwards through the descending liquid and strip undesired gases therefrom. Part or all the liquid containing the desired $C_2$, $C_3$ and $C_4$ hydrocarbons is withdrawn from the reboiler 56 and passed through the line 58 by pump 59 and through line 60 to the heating zone or coil 24. All or part of the uncondensed gases from the reflux separator 53 may be passed through lines 61, 62 and 63, and, as they are under pressure, they may be used to do work by being passed to a lower pressure through an expansion device or engine 64 from which useful energy is obtained. The expansion engine 64 may be of various types. For example, it may be of the reciprocating piston type, or it may be of the vapor turbine type. The energy derived from the expansion device 64 may be utilized to drive pumps or compressors or it may be used for other purposes.

The gases may leave the expansion engine 64 through line 65, valve 66, and line 67 through which they leave the system. Or valve 66 may be closed and the expanded gases leaving the expansion engine 64, having been cooled by this expansion, may be passed through lines 65, 68 and 69 to condenser 52. Valve 70 in line 68 is open and valve 71 in line 62 is closed. In condenser 52 the cooled gases supply part of the cooling necessary to furnish reflux to the fractionating tower 50, the balance of the cooling being furnished by other means such as refrigeration.

From the condenser 52 the expanded gases pass through line 72 to cooler 48, in which, by indirect exchange of heat, they supply part of the cooling to further liquefy the charge to tower 50. From the cooler 48, the gases leave the system through lines 73 and 67, the valve 74 in line 73 being open. If desired, a part or all of the high pressure gases leaving reflux separator 53 may be passed through line 61 and expansion valve 71 wherein the gases are expanded to a lower pressure and are cooled by this expansion. With valve 70 in line 68 and valve 75 in line 62 closed, the cooled gases may then be passed through line 69 and condenser 52 to furnish the cooling medium for the condenser. The gases then pass through line 72 and cooler 48 to further cool the charge to the fractionating tower 50, and then through lines 73 and 67.

In some instances the desired sharpness of separation of hydrogen and methane from higher boiling hydrocarbons is aided by still further cooling the charge to the fractionating tower 50. This may be accomplished by partially or completely closing valve 76 in line 58 and allowing part or all of the liquid leaving the reboiler 56 to pass through line 78 and cooler 80 wherein it is cooled to a certain extent. It is then expanded by passing through pressure reducing valve 82 to a lower pressure, and the resulting vaporization of all or a part of the liquid lowers its temperature so that when it is passed through line 84 and cooler 47 it abstracts heat by indirect exchange from the charge to the fractionating tower 50. The vapors and unvaporized liquid leave cooler 47 through line 86 and are passed to the heating zone or coil 24 through lines 86 and 60. This latter method of cooling may be used only when the pressure existing in the heating zone or coil 24 is lower than the pressure existing in the fractionating tower 50. If desired, coolers 47 and 48 may be omitted.

The liquid from separators 18 and 36 and part or all the liquid from the reboiler 56 is passed through the heating zone or coil 24 wherein it is heated under pressure to an elevated temperature to effect conversion thereof into higher boiling hydrocarbons. The heated products leave the heating zone or coil 24 through line 92 and are passed to a reaction zone 94 wherein the desired conversion is completed. If desired, the reaction chamber 94 may be omitted and the conversion completed in heating zone 24. The products from the reaction zone 94 are passed through line 95, cooler 96 and line 97 to a high pressure separating zone or tower 98 to separate light gases from liquid. The gases from separating zone 98, which include mostly hydrogen and methane, pass through line 100 and line 63 and are directed to the expansion engine 64 or other mechanical device. The liquid including liquefied $C_3$ and $C_4$ and if desired $C_2$ hydrocarbons is withdrawn from the bottom of separating zone 98 and passed through line 101 having a pressure reducing valve 102 and through a heat exchanger 103 in which the liquid is partially vaporized by any suitable medium.

The mixture is then passed to fractionating tower 106, wherein higher boiling hydrocarbons containing gasoline constituents are separated from gases. Liquid is withdrawn from fractionator 106 through line 107 to reboiler 108, wherein it is partially vaporized by indirect exchange of heat with a suitable heating medium. The vapors so formed are returned to tower 106 through line 109, while the liquid hydrocarbons including the gasoline constituents are withdrawn through valved line 110. Vapors leaving the top of fractionator 106 are passed through line 110' and condenser 111 and thence to reflux separator 112, in which liquid is separated and returned to tower 106 through line 113 as reflux. The separated gases containing mostly $C_2$, $C_3$ and $C_4$ hydrocarbons leave the separator 112 through line 114 and all or a portion thereof may be passed through line 115 and valve 116 and compressed by compressor 114' and thence through line 117 to the heating zone or coil 24 for further treatment therein.

Instead of passing through line 115, the valve 116 may be closed and the valve 118 in line 120 opened and the gases passed through line 120, and through valve 122 and lines 123 and 10, to the first compressor 12. Or the valve 122 may be closed and the valve 124 in line 125 opened and the gases passed through line 125 to the line 26 to the second compressor 30 for the separation of any light gaseous constituents contained therein as hereinbefore described.

While I have shown separators 18, 36 and 98 for separating liquefied gas from unliquefied gas, I may use well-known fractionating equipment, such as bubble towers, for this purpose. In addition, where I have shown bubble towers for fractionation, I may use any ordinary gas-liquid separator.

A typical operation of my invention will now be given but it is to be understood that I am not to be restricted to the operating conditions as these are by way of example only. Gases resulting from the conversion of higher boiling hydrocarbons to lower boiling hydrocarbons or similar gas mixtures from other sources are passed through compressor 12 wherein they are compressed to a pressure of about 20 to 200 pounds per square inch. The compressed gases are then passed to the separator 18 after being cooled and uncondensed gases are separated from liquid. The separated gases are passed through the second compressor 30 wherein they are compressed to a pressure of about 100 to 700 pounds per square inch.

The compressed gases leaving the second compressor are cooled and passed to the second separator 36 wherein liquid is separated from uncondensed gases. The separated gases from the second separator are passed to the third compressor 43 wherein they are compressed to a pressure of about 500 to 2000 pounds per square inch. The compressed gases leaving the third compressor 43 are cooled and passed to the fractionating tower 50 wherein uncondensed gases are separated from liquid. The separated gases from the fractionating tower 50 and from high pressure separator 98 are preferably passed through the expansion engine 64 to do work.

The composite liquid from the separators 18 and 36 and fractionating tower 50 in passing through the heating and reaction zones may be maintained under suitable temperature-pressure conditions effective to produce the desired conversion thereof into higher boiling liquid including gasoline. For example, the liquefied gases may be heated to a temperature of from about 750° to 1300° F. while under a pressure of 400 to 3000 pounds to effect polymerization of the normally gaseous hydrocarbons into normally liquid hydrocarbons. If a predominantly aromatic liquid product is desired, higher temperatures and lower pressure, with a shorter period of time, may be used. For example, when thus operating a temperature of from about 1200° to 1750° F. and a pressure from atmospheric to 200 pounds may be employed.

When I use the term "liquid" in the specification and claims to designate the liquid separated under pressure in each of the separators 18 and 36 and fractionating tower 50, it is to be understood that I am referring to liquefied normally gaseous hydrocarbons.

While I have shown a single embodiment of my invention it is to be understood that the invention is not restricted thereto and various modifications and adaptations thereof may be made without departing from the spirit of the invention.

I claim:

1. A process for treating hydrocarbon gases to produce higher boiling hydrocarbons which comprises passing a gaseous mixture containing methane and higher boiling hydrocarbons through a compressor, cooling the compressed gas and separating uncondensed gas from liquid, passing uncondensed gas so obtained through another compressor to further compress the gas, cooling the compressed gas and separating uncondensed gas from liquid, passing such uncondensed gas through a third compressor, cooling and separating uncondensed gas from liquid, passing the last mentioned uncondensed gas through an expansion mechanism whereby the pressure on the gas is released and the gas is cooled, passing the liquid separated from the compressed and cooled gases through a conversion zone maintained under a suitable pressure and temperature to effect the desired conversion into higher boiling normally liquid hydrocarbons, cooling the converted products and separating uncondensed gases from liquid, passing the last mentioned gases through said expansion mechanism whereby the pressure on the gases is reduced and the gases are cooled and using the cooled gases leaving said expansion mechanism for cooling the compressed charge leaving said third compressor.

2. A process for treating hydrocarbon gases to produce higher boiling hydrocarbons which comprises passing a gaseous mixture containing methane and higher boiling hydrocarbons through a compressor, cooling the compressed gas and separating uncondensed gas from liquid, passing uncondensed gas so obtained through an expansion mechanism whereby the pressure on the gas is released and the gas is cooled, passing the liquid separated from the compressed and cooled gas through a conversion zone maintained under a suitable pressure and temperature to effect the desired conversion into higher boiling normally liquid hydrocarbons, cooling the converted products and separating uncondensed gases from liquid, passing the last mentioned gases through said expansion mechanism whereby the pressure on the gases is reduced and the gases are cooled and using the combined cooled gases leaving said expansion mechanism for cooling the compressed gas.

3. A process for treating hydrocarbon gases to produce higher boiling hydrocarbons which comprises subjecting a gaseous mixture containing hydrocarbons having at least two carbon atoms per molecule to compression, cooling the compressed gases and separating the resulting condensate from uncondensed gases, passing the condensate separated from the compressed and cooled gases through a conversion zone maintained under conditions of temperature and pressure effective to convert low-boiling hydrocarbons contained in said condensate to higher boiling normally liquid hydrocarbons, fractionating the conversion products to separate a condensate therefrom, passing gases uncondensed in said fractionating operation through an expansion mechanism whereby the pressure on the gases is reduced and the gases are cooled, and employing the cooled gases leaving said expansion mechanism for cooling the compressed gases.

GERALD L. EATON.